(12) United States Patent
Semmens

(10) Patent No.: US 7,169,464 B2
(45) Date of Patent: Jan. 30, 2007

(54) ALIGNED EXTRUDATE STRUCTURE

(75) Inventor: Blaine K. Semmens, Sacremento, CA (US)

(73) Assignee: Conservation Roofing Systems, Inc., Jamestown, CA (US)

( * ) Notice: Subject to any disclaimer, the term of this patent is extended or adjusted under 35 U.S.C. 154(b) by 121 days.

(21) Appl. No.: 10/837,284

(22) Filed: Apr. 30, 2004

(65) Prior Publication Data

US 2005/0008810 A1    Jan. 13, 2005

Related U.S. Application Data

(60) Provisional application No. 60/466,881, filed on Apr. 30, 2003.

(51) Int. Cl.
- *B32B 3/26* (2006.01)
- *B32B 9/00* (2006.01)
- *E04B 1/16* (2006.01)

(52) U.S. Cl. ................ 428/304.4; 428/304.4; 428/318.4; 428/319.1; 52/340

(58) Field of Classification Search ............. 428/304.4, 428/318.4, 319.1; 52/340
See application file for complete search history.

(56) References Cited

U.S. PATENT DOCUMENTS

| | | | |
|---|---|---|---|
| 3,808,085 A * | 4/1974 | Givens, Jr. .................... 52/340 |
| 3,971,075 A | 7/1976 | Heinbaugh et al. ......... 4/172.19 |
| 4,128,369 A | 12/1978 | Kemerer et al. ............. 425/113 |
| 4,128,975 A * | 12/1978 | Abate ......................... 52/125.4 |
| 4,295,316 A | 10/1981 | Carlson ........................ 52/588 |
| 4,306,395 A | 12/1981 | Carpenter .................... 52/223 |
| 4,399,186 A | 8/1983 | Lauderback ................. 428/291 |
| 4,817,358 A | 4/1989 | Lincoln et al. ............... 52/557 |
| 4,884,682 A | 12/1989 | Weder et al. ............... 206/83.5 |
| 5,094,058 A | 3/1992 | Slocum ........................ 52/533 |
| 5,295,340 A | 3/1994 | Collins ........................ 52/518 |
| 5,482,550 A | 1/1996 | Strait .......................... 106/677 |
| 5,603,758 A | 2/1997 | Schreifels, Jr. et al. ..... 106/677 |
| 5,622,556 A | 4/1997 | Shulman ..................... 106/677 |
| 5,631,053 A * | 5/1997 | Andersen et al. .......... 428/36.4 |
| 5,641,584 A | 6/1997 | Andersen et al. ........... 428/703 |
| 5,846,894 A | 12/1998 | Singh et al. ................. 501/155 |
| 6,030,446 A | 2/2000 | Doty et al. ................. 106/677 |
| 6,035,583 A | 3/2000 | Papke ......................... 52/79.1 |
| 6,161,354 A | 12/2000 | Gilbert et al. ................ 52/520 |
| 6,233,892 B1 | 5/2001 | Tylman ................... 52/309.12 |
| 6,245,381 B1 | 6/2001 | Israel .......................... 427/186 |
| 6,319,456 B1 | 11/2001 | Gilbert et al. .............. 264/519 |
| 2001/0049918 A1 | 12/2001 | Gilbert et al. ................ 52/518 |
| 2002/0033563 A1 | 3/2002 | Gilbert et al. .............. 264/557 |

* cited by examiner

*Primary Examiner*—Terrel Morris
*Assistant Examiner*—Victor Chang
(74) *Attorney, Agent, or Firm*—Gifford, Krass, Groh, Sprinkle, Anderson & Citkowski, P.C.

(57) ABSTRACT

The present invention provides an improved composite material structure having large portions of additive material aligned over a substantial width of a material structure and occupying a larger percentage of the structure volume. The material structure includes a resilient substrate layer or conventional decking having a plurality of elongated rods arranged on a surface of the substrate layer to form at least one rod layer. The spaces between rods are filled with a slurry material which is allowed to set causing the component elements to bond together to form a lightweight durable and high strength composite material structure.

11 Claims, 5 Drawing Sheets

US 7,169,464 B2

ALIGNED EXTRUDATE STRUCTURE

RELATED APPLICATION

This application claims priority of U.S. Provisional Patent Application Ser. No. 60/466,881 filed Apr. 30, 2003, which is incorporated herein by reference.

FIELD OF THE INVENTION

The present invention generally relates to building material structures and, in particular, to building material structures containing aligned extrudate inclusions.

BACKGROUND OF THE INVENTION

The choice of a building material structure often involves a compromise between structure strength, weight, durability, cost and handling characteristics. Owing to the difficulties in balancing these disparate requirements in a single structural material such as stone, brick, cement or the like, the building trades increasingly are relying upon composite materials that maintain the desirable properties of the principal component while ameliorating disadvantageous properties of the primary component. Laminated and filler-containing materials are often relied upon as lower cost, higher performance alternatives to monolithic materials. Such fillers have traditionally been in the form of granulate, flakes, chopped fibers and woven webs. The requirement for a comparatively large amount of matrix material to support such additions has limited the range of properties afforded by such materials. Thus, there exists a need for a material structure having large portions of additive aligned over the substantial width of a material structure and occupying a larger percentage of the structure volume.

SUMMARY OF THE INVENTION

The present invention provides a composite material structure having large portions of additive material being aligned over a substantial width of a material structure wherein the additive material occupies a larger percentage of the structure volume. Particularly, the composite material structure is applied over a resilient substrate layer, conventional roofing decking or wall assembly that provides a rigid base or support surface for forming the composite material structure. A thin layer of slurry material is added to a surface of the substrate layer as an adhesive for securing the additive material to the substrate surface during construction. The slurry material is also operative to provide some rigidity to the composite material once the structure is completely formed.

A plurality of elongated rods are arranged on the surface of the substrate layer having the thin layer of slurry material applied thereto. Preferably, the plurality of elongated rods are symmetrically arranged in a parallel fashion such that at least one rod layer is formed on the surface of the substrate layer. Such rods are readily formed as virgin extrudate or from chopped anisotropic foamed debris. The formation of at least one rod layer on the substrate layer enhances the overall structural rigidity of the composite material to be formed as a substitute for the rigidity that would be provided by a composite material having only a substrate layer and a slurry material filler.

After the plurality of elongated rod layers have been arranged on the substrate layer in a parallel fashion, the composite material structure is completed by filling the spaces between elongated rods with the slurry material which is then allowed to set and bond the composite material elements together while providing extra rigidity to the composite material structure. Optionally, a spacer is used to control the spacing between the adjacent elongated rods while the slurry material is applied. In this manner a larger percentage of the structural volume of the composite material structure is provided by the elongated rods which may be formed of a desired material having characteristics that provide advantages over existing composite material structure fillers.

BRIEF DESCRIPTION OF THE DRAWINGS

A better understanding of the present invention will be had upon reference to the following detailed description when read in conjunction with the accompanying drawings wherein like reference characters refer to like parts in which.

DETAILED DESCRIPTION OF THE INVENTION

The present invention has utility as a building structural material operative as siding or roofing assembly. Use is optionally also made herein of waste foamed plastics.

In a preferred embodiment, extrudate material operative in the present invention is formed through the compaction of chips or flakes, or other high dimensional aspect ratio forms of waste foamed polymeric material. The waste foamed polymeric material illustratively including plates, food trays, cups, packing peanuts, scrap, and combinations thereof. A process for preparing chopped waste includes washing the waste, if necessary to remove debris that will interfere with cementitious bonding to the foamed polymeric material, followed by feeding the material into a chopper to form particulate having at least one anisotropic axis. It is appreciated that the application of heat in the form of steam will further expand the polymeric material. The chopped polymeric material is then mixed with an inorganic cementitious slurry and compressed to form an oriented polymeric cement board or other preform structure. While it is appreciated that the specific amount of inorganic cementitious slurry necessary to form a chopped foam material structure varies with variables such as anisotropic-shape, -size, -surface area, and cement viscosity. In the instance where a chip has a thickness of 3 millimeters and an average surface area of from 2 to 10 square centimeters, an inorganic cementitious slurry is effective in producing a shredded component structure with the addition of from 5 to 40 volume percent relative to the amount of chip material present. Preferably, the slurry is present from 10 to 30 volume percent for typical roofing installations. The resulting board or other structure is well suited for assembly in the field through coating with inorganic cementitious slurries to form a lightweight roofing material. Additionally, the resulting preform is amenable to machining operations to form more intricate forms such as roofing shakes, siding, or complex shapes preformed to match the contours of a substrate. Alternatively, preformed rods or boards are readily coated with inorganic cementitious slurries upon production to form completed roofing or siding subassembly components such as boards, shakes or the like that are delivered to a structure and immediately applied thereto. The coating of individual rods or boards according to the present invention with an inorganic cementitious slurry with compression of the mass prior to slurry setup is effective in controlling air voids within a preassembled structure according to the present invention.

Figure 1:
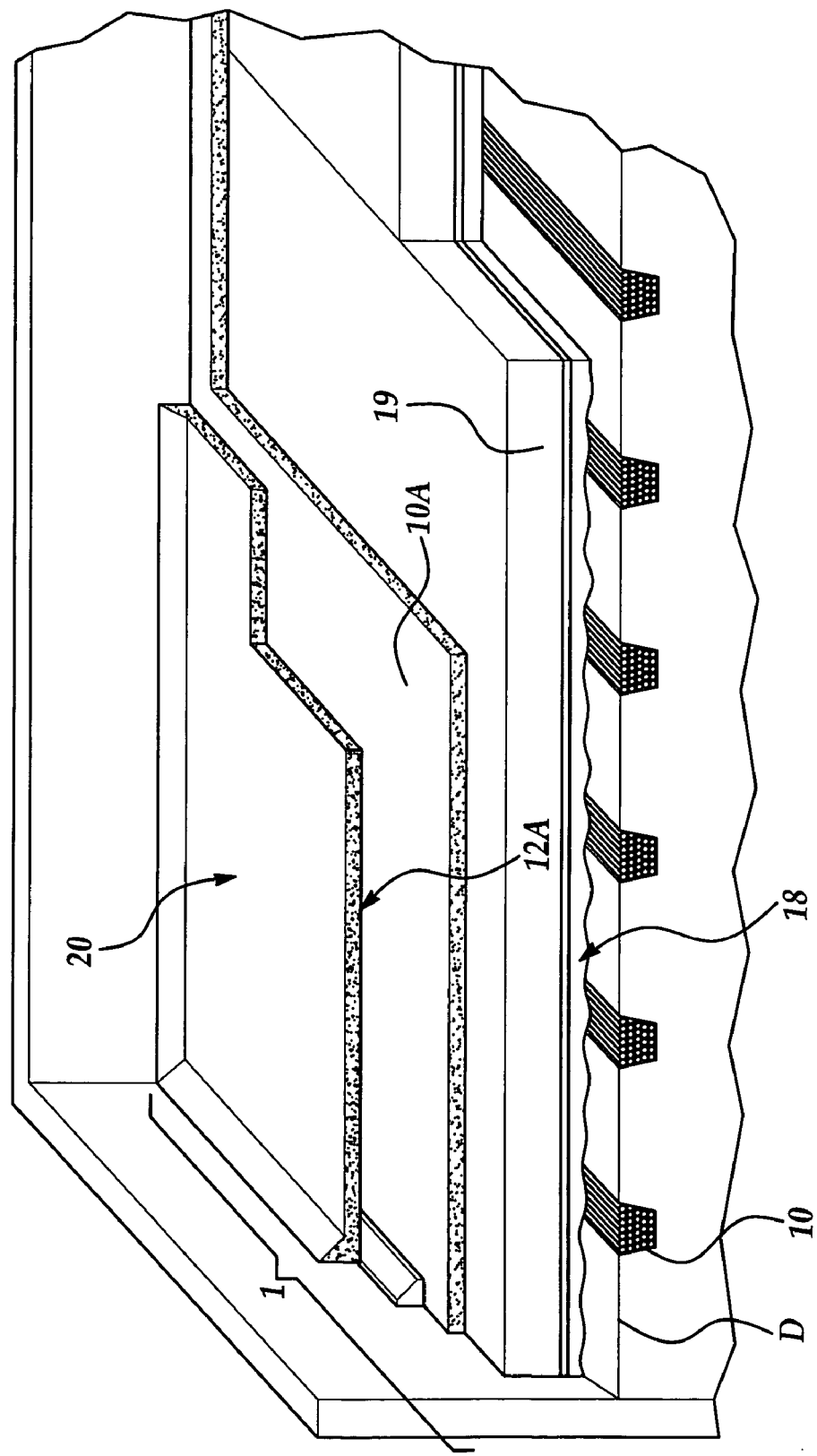
FIG. 1 is an elevated view of a roofing installation structure as according to the invention.

FIG. 1 illustrates a cross section of an inventive roofing installation shown generally at 1. A composite material structure 10 has large portions of additive material aligned over a substantial width of a material structure formed into rods or boards that occupy a large percentage of the structure volume. The structure 10 is formed to fill the flutes of an underlying metal deck D. It is appreciated the distribution of forces over the body of a material structure enhances the structure's load bearing capabilities as compared to applying a concentrated force to a similar body. The present invention relies on this principle in providing a resiliently rigid and durable composite material structure having large portions of additive material symmetrically aligned over a substantial width of a material structure and occupying a large percentage of the structure volume. The composite material structure 10 has utility as building material for use in commercial, residential and/or industrial applications.

Figure 2:
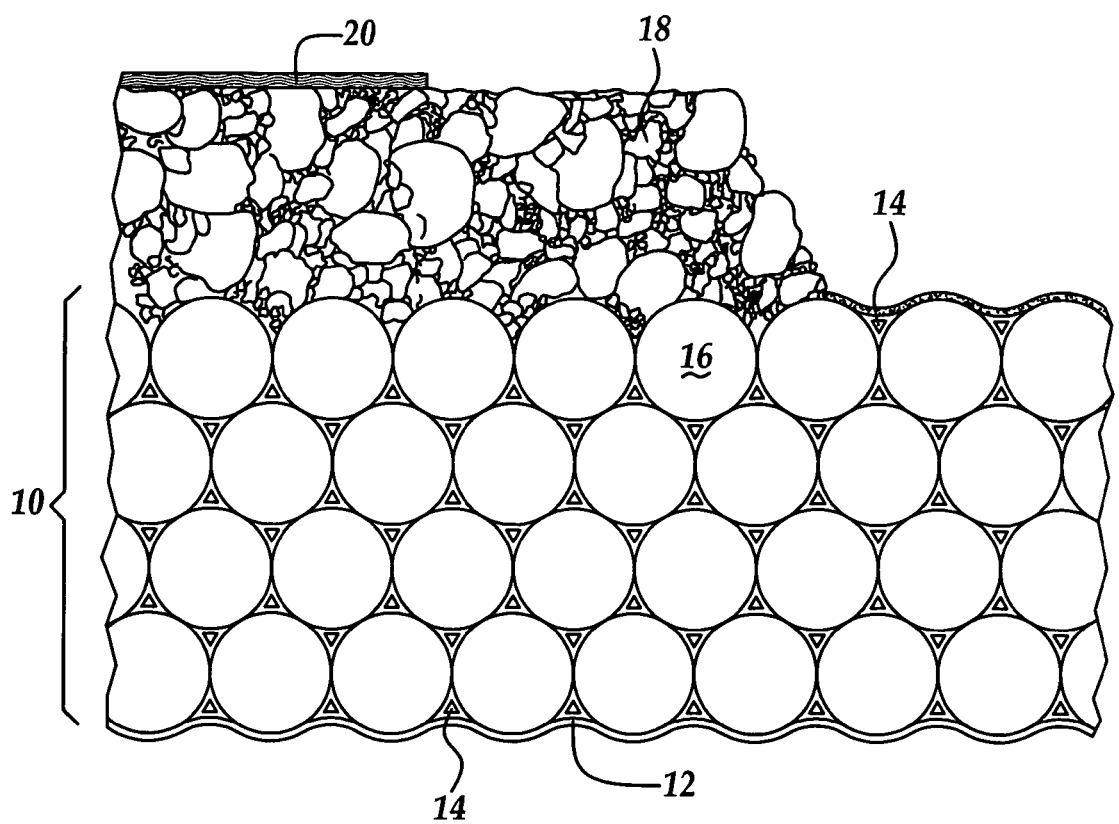
FIG. 2 exemplifies an arrangement of the component elements of the composite material structure as according to the invention.

As best illustrated in FIGS. 1 and 2, the composite material structure 10 as according to the invention includes a resilient layer 12 that provides a base or support surface for the composite material structure. Preferably, the layer 12 is formed from foamed insulated materials and other types of conventional materials known to those skilled in the art may be used which illustratively include rigid lightweight and durable materials such as foamed polystyrene, polyisocyanate, expanded perlite containing insulations, cardboard, polymer compounds, particleboard, and the like. In this case, it is desired for its insulative and shock-absorbing properties as well as its light weight. Plastic foam is exceptionally durable, making it effective as a protective material in a variety of applications such as packing, building and/or insulating material. Typically foam is made up of more than 90% closed cell gaseous volume of air, carbon dioxide, or other gases, and due to its extremely low weight and durability, it is frequently desired as a construction material. Preferably, all the foamed elements used to construct the composite material structure herein are formed from recycled waste material such as disposable lunch trays, packing materials, carpet fibers, beverage cups, and carry-out containers or alternatively, a thermoplastic material having a well defined glass transition temperature is readily melted and extrusion spun into a fiber operative in the present invention. The waste material is recycled according to conventional processes wherein substantially all of the waste material is converted into a usable valuable product rather than landfill.

Referring to FIG. 2, a thin layer of slurry material 14 is disposed on a surface of the layer 12 or metal deck D to provide an adhesive layer on which additive materials may be disposed in forming the composite material structure. Preferably, the slurry material 14 is a cementitious material and illustratively includes calcium sulfate hemihydrate (gypsum), Portland, magnesia cements, aluminum calcite, and most preferably, a magnesia cementitious material such as magnesium oxychloride, magnesium oxysulfate (MOS) or magnesium phosphate cement (MAP). It is appreciated that a cement is modified with various conventional additives illustratively including polymeric colloidal particulate, emulsion, surfactants, and air entrainment to yield a variety of physical properties for various applications.

The composite material structure 10 includes a plurality of elongated rods 16 as the additive material used to fill the bulk of the volume of the material structure. The elongated rods 16 are arranged on the layer 12 or metal deck D coated with a thin layer of slurry material 14 to form at least one rod layer. Preferably, the elongated rods 16 are made of an extruded foamed plastic material; however, it is appreciated that other materials are optionally substituted therefor, these illustratively include polymer fibers, plastic tubing, metal tubing, and straw. Most preferably, the material used to form the rods 16 comprises a carbonate compound additive that is operative to release carbon dioxide gas upon reaching a decomposition temperature. Accordingly, this would make the elongated rods used in the composite material structure substantially fire resistant. Alternatively, a small percentage of finely ground dolomite can be added to the extrudate resin before expansion such that these powders will be suspended in the cell walls of the foamed extrudate material and will be responsible for the release of carbon dioxide gas from the formed elongated rods 16 in the event of a fire contacting the composite material structure 10. Still further, a post-extrudate fire-resistant powder, e.g. dolomite, calcium carbonate, calcium oxide, talc, or magnesium hydroxide, may be disposed on the surface of the elongated rods of the composite material structure 10.

Figure 3:
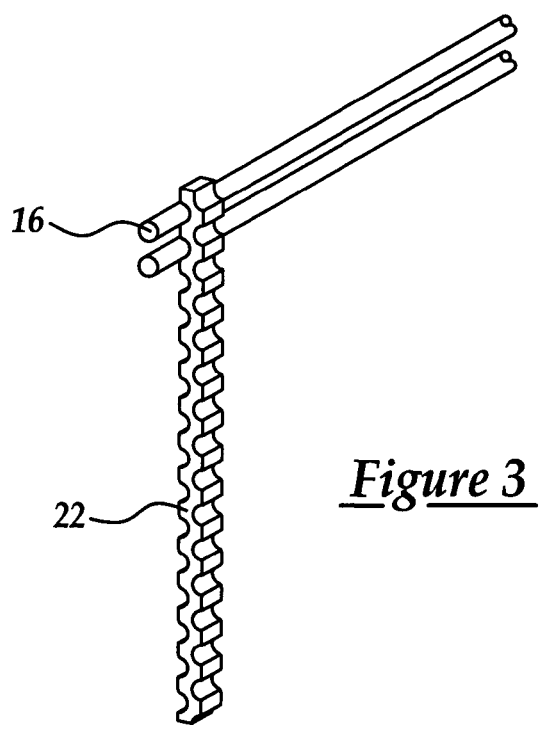
FIG. 3 illustrates a perspective view of a composite material as according to FIG. 2 further including a spacer for supporting the elongated rods in a symmetrical and spaced-apart fashion.

As shown in FIG. 3, the elongated rods 16 may be arranged in spaced-apart symmetrical fashion through the utilization of spacers 22 that support the elongated rods 16 within the composite material 10. After arranging the at least one rod layer on the layer 12 in a spaced-apart fashion, the voids formed between the adjacent rods are filled with the slurry material 14 and allowed to set such that the layer 12 and elongated rods are securely bound together to form the composite material structure.

Other materials may be added to the composite material structure 10 to facilitate its use in various applications. As according to FIG. 2, the composite material structure 10 as described above is disposed with a combination of slurry and polyester fabric that forms a resilient shock-absorbing layer that adds to the durability of the composite material. Other materials may be used for such purposes illustratively including synthetic fibers, saw dust, finely ground plastic aggregate, or other lightweight shock-absorbent materials.

The structure 10 is overlayered with an inorganic cementitious slurry of a thickness of greater than 0.2 centimeters. Preferably, the overlying slurry 18 has a thickness of between 0.3 and 2 centimeters. Optionally, the overlying slurry 18 incorporates a polymeric fiber, polymeric, mat, inorganic fiber, or inorganic mat in instances where additional strength is required. A foamed or otherwise expanded polystyrene insulation board of conventional design or that formed of waste regrind according to the present invention 19 is applied thereover. The board 19 has a thickness commensurate with the insulation factor desired for the inventive roofing installation 1. The insulation board 19 is overcoated with an additional layer of composite material structure 10A. Preferably, structure 10A is aligned with the elongated rods thereof being nonparallel to those of structure 10. It is appreciated that while the installation 1 depicted in FIG. 1 has only a single insulation board 19 and structure 10A, that these two layers in combination can be repeated multiple times within an inventive installation. In the instance where repetitive insulation board and structure layers 10A are present, it is preferred that the orientation of the rods within each of the layers 10A varies relative to other structure layers 10A. A resilient layer 12A comparable to previously described layer 12 overlies structure 10A. Optionally, a conventional elastomeric layer 20 is applied over layer 12A in order to inhibit water intercalation.

Figure 4:
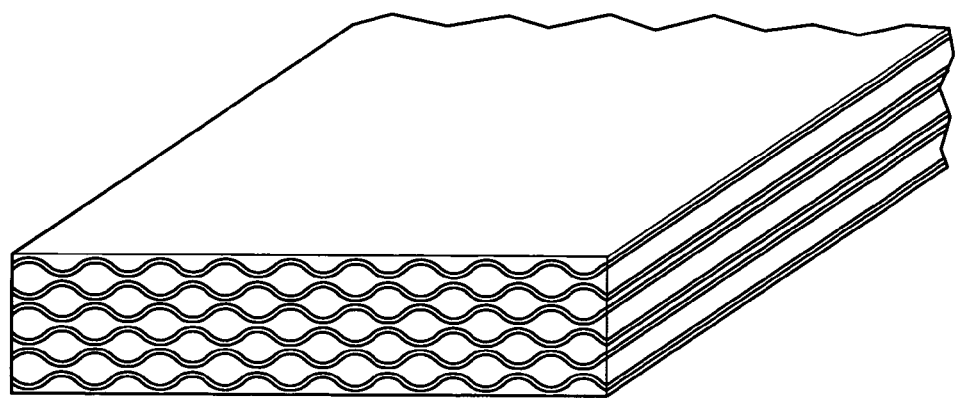
FIG. 4 illustrates a composite material structure formed using extrudate material layers having undulating surfaces.

While the inventive rods 16 have been depicted as circular in cross section, it is appreciated that this shape is only exemplary and various other cross sections are operative herein illustratively including triangular, rectilinear, pentagonal, hexagonal, non-regular variants thereof, and combinations thereof. In an embodiment depicted in FIG. 4, the elongated rods 16 are formed as a sheet having undulating surfaces that upon stacking interlock inorganic cementitious slurry therebetween to form a structure 10 as detailed above.

Figure 5:
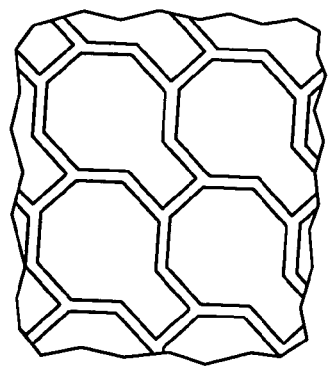
FIGS. 5 and 6 illustrate extrudate rods formed in other exemplary geometric shapes and arranged in stacked configurations.
Figure 6:
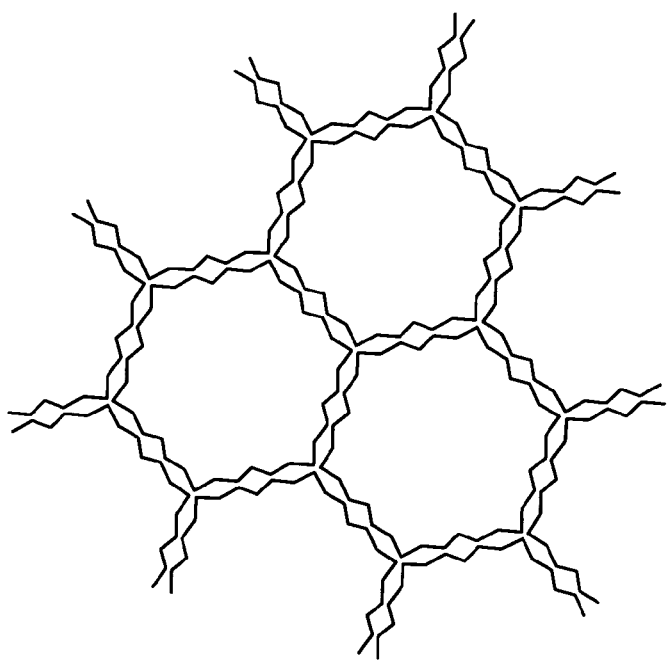

FIGS. 5 and 6 illustrate two other examples of the many geometric shapes that the extrudate rods may be formed whereby the exterior surfaces of the adjacent rods abut complementarily such that stacking results in the formation of a composite material structure 10.

Preferably, the rods 16 undergo a preprocessing step of being wet with a spray of inorganic slurry before being stacked on the substrate layer 12. To aid in handling of wet components, the slurry 14 can be made to set in thin sheets and then milled to granules and optionally combined with a expanded polystyrene (EPS) dust. This mixture can be sprinkled on the surface of the wet rod and EPS board assembly. In this manner the first rod layer can be arranged on the substrate layer 12 in a more precise fashion due to the adhesive properties of the slurry material 14 that coats the surface of each elongated rod 16 and to further aid in field installation to like slurries. Preferably, each elongated rod 16 is one-eighth inch thick; however, other thicknesses may be utilized dependent on the application such that the desired durability and strength is provided.

Further, it is preferable that the layer 12 used to form the composite material structures 10 is two feet by four feet, width by length, and of adequate thickness such that the substrate layer 12 provides an adequate support surface for the composite material structure 10.

Figure 7:
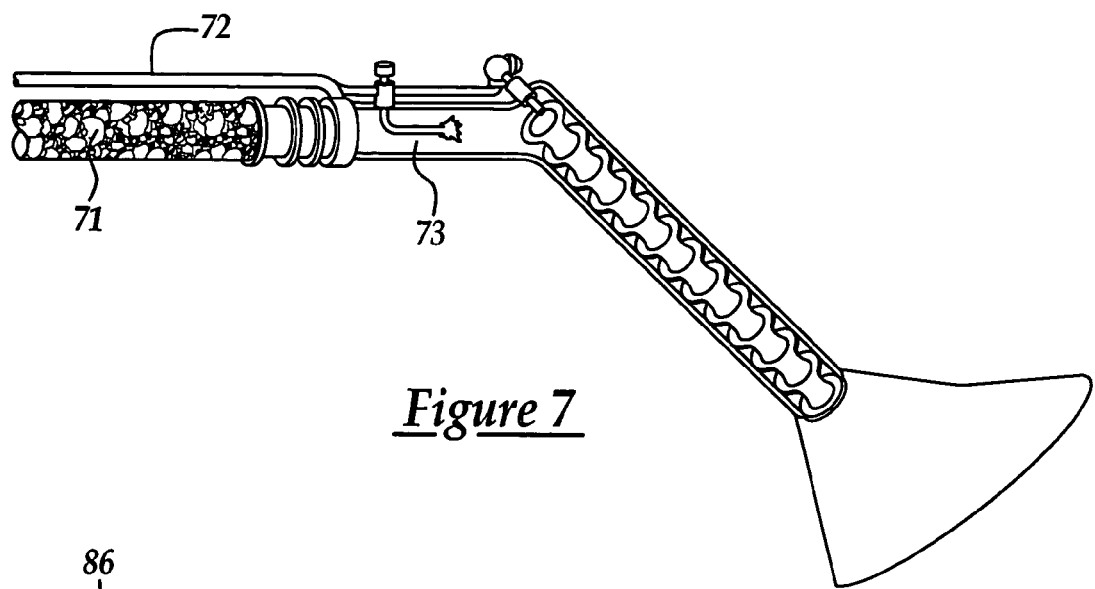
FIG. 7 illustrates a slurry material mixing/dispensing apparatus.

FIG. 7 is illustrative of a mixing/dispensing apparatus 70 for the slurry material used with the composite material structure 10. The apparatus 70 receives dry EPS regrind and inorganic slurry materials through separate delivery channels 71 and 72, respectively in a mixing chamber 73 equipped with a slurry jet 74 to assure regrind wetting. Mixing is accomplished via an auger terminating in a dispensing nozzle 76 that regulates dispensing at a predetermined rate. Preferably, the auger is a pair of twin augers 75 with reversed intermeshed threads to promote regrind wetting and extrusion of the material.

Figure 8:
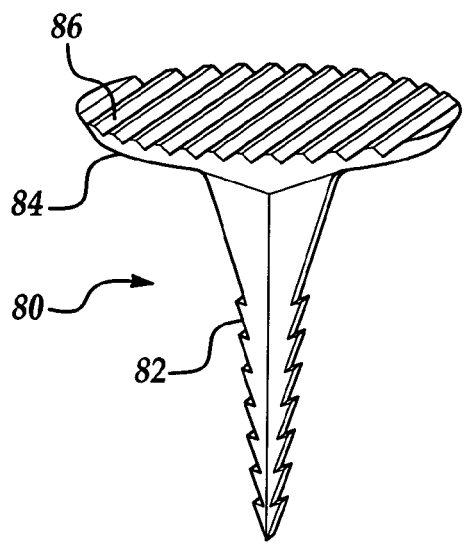
FIG. 8 exemplifies a fastener for use with the composite material structure of the present invention.
Figure 9:
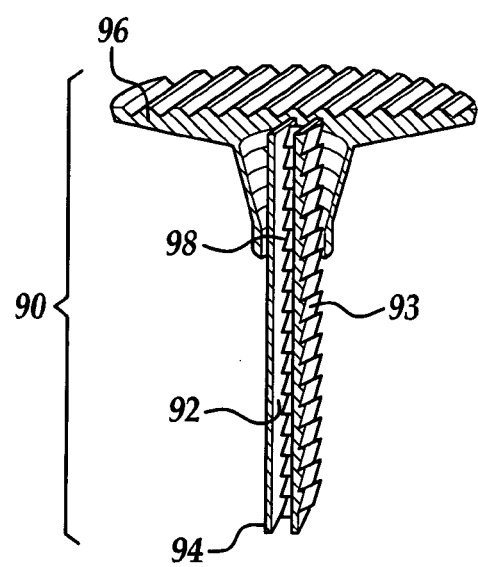
FIG. 9 exemplifies a second fastener for use with the composite material structure of the present invention.

FIGS. 8 and 9 illustrate fastening elements 80 and 90 respectively which may be used with the composite material structure 10 in order to secure a foamed insulation board thereto with or without a wet slurry 18 as shown in FIG. 1. FIG. 8 illustrates a fastener 80 having a shaft that includes serrated edges 82 for opposing extraction after insertion and an insulation board cap 84. Preferably, the fastener 80 has a slurry receiving grid 86. FIG. 9 illustrates a fastener 90 having an elongated shaft 92 terminating in a point 94 for ease of insertion into the composite material structure and an H-shaped cross section. The shaft 92 has serrations 93 therealong. The fastener 90 has an insulation board cap 96. In the preferred embodiment depicted in FIG. 9, the cap 96 is a separate piece relative to the shaft 92. The cap 96 has an interior bevel 98 that engages the serrations 93 and preferably a flare 99 extending towards the cap end 100 so as to define a slurry receiving cavity 102.

According to the present invention, a fastener is constructed of either metal or plastic, or combination thereof. In the instance of a metal fastener, it is appreciated that adhesion of cementitious materials thereto is facilitated by a polymeric coating. Nitrile plastics are well suited for the formation of a plastic fastener.

Figure 10:
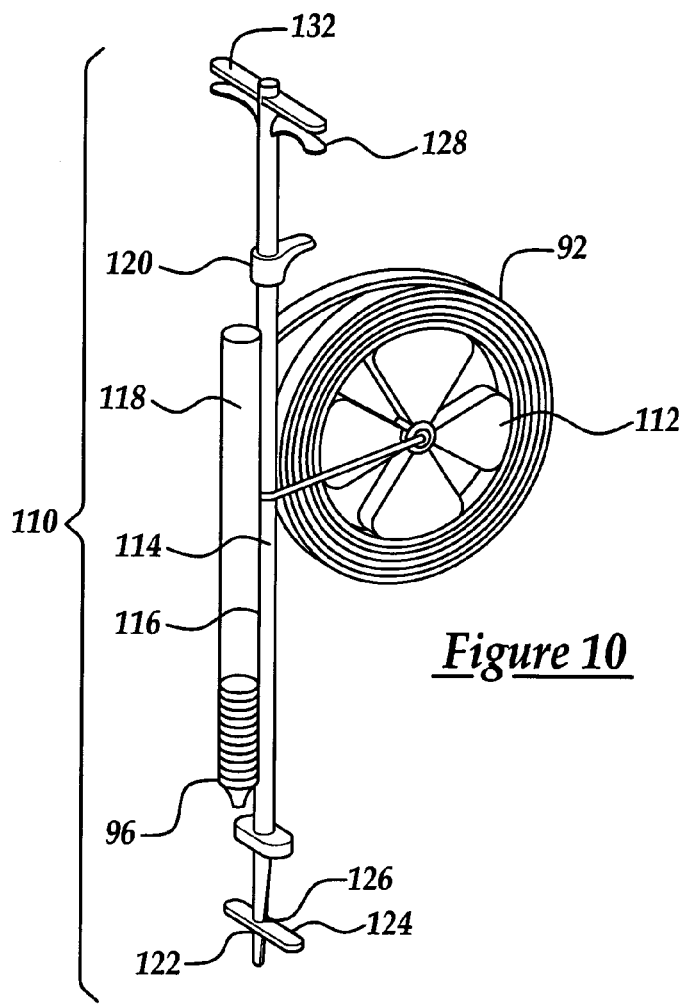
FIG. 10 illustrates a power tool for use in installing the fasteners in the composite material structure.

FIG. 10 depicts an insertion tool suitable for the rapid installation of a fastener 90. The tool is shown generally at 110 and includes a spool 112 of continuous shaft material 92. The shaft material 92 is fed through the core 114 of the elongated tool body 116. A tube 118 is mounted on the body 116 for the storage of caps 96. A spring-mounted lever 120 strips a cap 96 from the tube 118 and places the cap 96 in concentric alignment with the shaft material 92 extending from the base 120 of the body 116. The application of pressure to the footrest 124 ejects a punch 126 through the underlying substrate 12 or decking D to a create a pilot hole concentric with cap 96 and the shaft material 92. The shaft material 92 is then driven into engagement with the cap 96 and the underlying substrate and composite material structure 10. A cutter 128 is activated after placement of the fastener 90 through closure of a lever 129 proximal to a tool handle 130.

Figure 11:
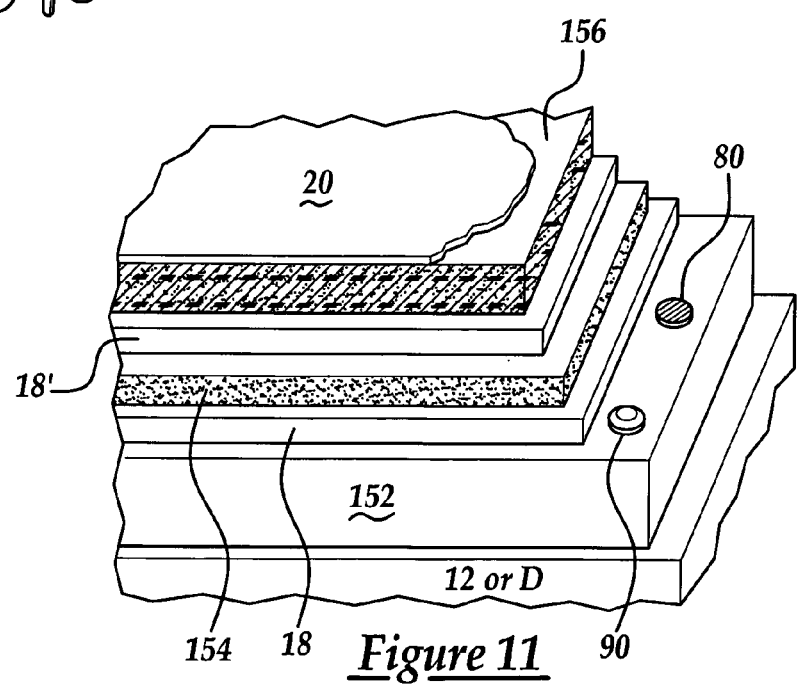
FIG. 11 is an elevated view of an alternative embodiment of an inventive roofing installation.

The alternate embodiment of the inventive roofing installation is depicted in FIG. 11 at 150 where like numerals correspond to those detailed with respect to the aforementioned figures. Conventional foam plastic insulation 152 is secured to an underlying resilient substrate 12 or decking D with the use of an inventive fastener 80 or 90 or a conventional fastener. A layer of inorganic cementitious slurry 18 overlies the foam plastic insulation 152 and serves to adhere an overlying oriented polymeric cement board 154. A second layer of inorganic cementitous slurry 18' overlying the oriented polymeric cement board 154 adheres a fiber mat material 156, where the fiber mat 156 is either woven or non-woven. The fiber mat 156 is optionally overcoated with an elastomeric roof coating 20.

From the foregoing it can be seen that the present invention provides a composite material structure wherein large portions of an additive material are aligned over a substantial width of a material structure whereby a larger percentage of the structure volume is filled by the additive material resulting in a more durable yet lightweight material structure.

Having described the invention, however, many modifications thereto will become apparent to those skilled in the art to which it pertains without deviation from the spirit of the invention as defined by the scope of the appended claims.

I claim:

1. A composite material structure comprising:
   a substrate layer;
   a slurry material; and
   a plurality of elongated rods arranged on said substrate layer to form at least one rod layer, wherein said slurry material fills the spaces between and circumferentially coats said plurality of rods and bonds said plurality of rods to said substrate layer;
   wherein said plurality of rods are formed from a foam extrudate material.

2. The composite material of claim 1 wherein said extrudate material is recycled polystyrene.

3. The composite material of claim 1 wherein said extrudate material comprises at least one carbonate compound.

4. The composite material of claim 1 wherein said substrate layer is formed of expanded polystyrene.

5. The composite material of claim 1 wherein said slurry material is made from an inorganic material.

6. The composite material of claim 5 wherein said slurry material is magnesia cement.

7. The composite material of claim 6 wherein said magnesia cement is a magnesium oxysulfate cement.

8. The composite material of claim 6 wherein said magnesia cement is a magnesium phosphate cement.

9. The composite material of claim 1 further comprising a reflective elastomeric layer disposed on top of said at least one rod layer.

10. The composite material of claim 2 wherein said polystyrene is self sealing.

11. The composite material of claim 1 further comprising at least one rod spacer operative to support said rods symmetrically spaced apart.

* * * * *